(12) United States Patent  
Juenemann et al.

(10) Patent No.: US 8,214,596 B2  
(45) Date of Patent: Jul. 3, 2012

(54) APPARATUS AND METHOD FOR SEGMENTED CACHE UTILIZATION

(75) Inventors: Dale Juenemann, Portland, OR (US); R. Scott Tetrick, Portland, OR (US); Oscar Pinto, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 865 days.

(21) Appl. No.: 12/286,340

(22) Filed: Sep. 30, 2008

(65) Prior Publication Data

US 2010/0082904 A1 Apr. 1, 2010

(51) Int. Cl.
*G06F 12/00* (2006.01)

(52) U.S. Cl. ............... 711/119; 711/E12.044

(58) Field of Classification Search .......... None
See application file for complete search history.

(56) References Cited

U.S. PATENT DOCUMENTS

| | | | |
|---|---|---|---|
| 7,047,387 B2 * | 5/2006 | Goodsell | 711/170 |
| 2001/0037433 A1 * | 11/2001 | Dempsey et al. | 711/141 |
| 2005/0015562 A1 * | 1/2005 | Goodsell | 711/170 |
| 2009/0210620 A1 * | 8/2009 | Jibbe et al. | 711/114 |

* cited by examiner

*Primary Examiner* — Edward Dudek, Jr.
*Assistant Examiner* — John P Fishburn
(74) *Attorney, Agent, or Firm* — Jordan IP Law, PC (57) ABSTRACT

In some embodiments, a non-volatile cache memory may include a segmented non-volatile cache memory configured to be located between a system memory and a mass storage device of an electronic system and a controller coupled to the segmented non-volatile cache memory, wherein the controller is configured to control utilization of the segmented non-volatile cache memory. The segmented non-volatile cache memory may include a file cache segment, the file cache segment to store complete files in accordance with a file cache policy, and a block cache segment, the block cache segment to store one or more blocks of one or more files in accordance with a block cache policy, wherein the block cache policy is different from the file cache policy. The controller may be configured to utilize the file cache segment in accordance with information related to the block cache segment and to utilize the block cache segment in accordance with information related to the file cache segment. Other embodiments are disclosed and claimed.

18 Claims, 7 Drawing Sheets

| FILE NUMBER | FILE RECORD | ALTERNATE DATA |
|---|---|---|
| 0 | FILENAME | % ACCESSED |
| 1 | FILENAME | % ACCESSED |
| 2 | FILENAME | % ACCESSED |
| 3 | FILENAME | % ACCESSED |
| 4 | FILENAME | % ACCESSED |
| 5 | FILENAME | % ACCESSED |
| ⋮ | ⋮ | ⋮ |
| N | FILENAME | % ACCESSED |

APPARATUS AND METHOD FOR SEGMENTED CACHE UTILIZATION

The invention relates to cache utilization. More particularly, some embodiments of the invention relate to an apparatus and method for utilizing a segmented cache in an electronic system such as a processor-based system.

BACKGROUND AND RELATED ART

Many electronic systems benefit from the use of cache memory. In some electronic systems, driver software may be provided to utilize cache memories. In a white paper published at ftp://download.intel.com/design/flash/NAND/turbomemory/whitepaper.pdf, a white paper describes Intel® Turbo Memory as consisting of an Intel Turbo Memory controller ASIC (Application Specific Integrated Circuit) chip and two Intel NAND flash non-volatile memory components that enable faster resume to productivity after hibernate, providing additional power savings by limiting hard disk drive accesses and increasing application responsiveness for a richer user experience.

BRIEF DESCRIPTION OF THE DRAWINGS

Various features of the invention will be apparent from the following description of preferred embodiments as illustrated in the accompanying drawings, in which like reference numerals generally refer to the same parts throughout the drawings. The drawings are not necessarily to scale, the emphasis instead being placed upon illustrating the principles of the invention.

DESCRIPTION

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well known devices, circuits, and methods are omitted so as not to obscure the description of the present invention with unnecessary detail.

Figure 1:
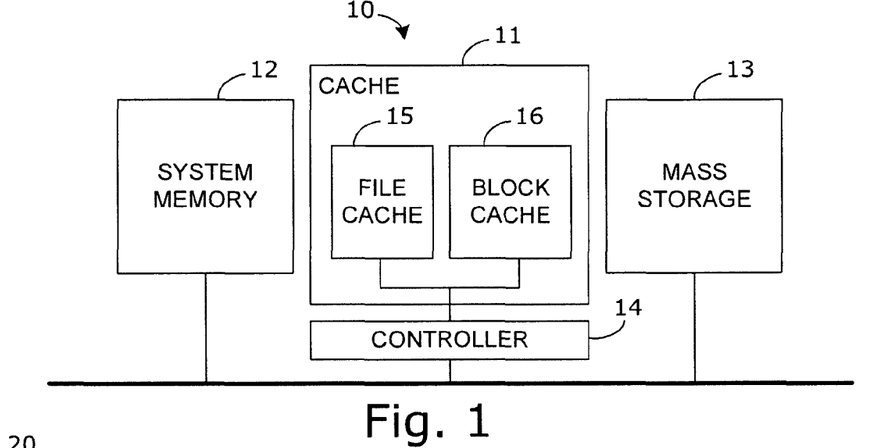
FIG. 1 is a block diagram of an electronic system in accordance with some embodiments of the invention.

With reference to FIG. 1, a cache memory device 10 may include a segmented cache memory 11 configured to be located between a system memory 12 and a mass storage device 13 of an electronic system, and a controller 14 coupled to the segmented cache memory 11, wherein the controller 14 is configured to control utilization of the segmented cache memory 11. The segmented cache memory 11 may include a file cache segment 15, the file cache segment 15 to store complete files in accordance with a file cache policy, and a block cache segment 16, the block cache segment 16 to store one or more blocks of one or more files in accordance with a block cache policy, wherein the block cache policy is different from the file cache policy. For example, the controller 14 may be configured to utilize the file cache segment 15 in accordance with information related to the block cache segment 16 and to utilize the block cache segment 16 in accordance with information related to the file cache segment 15.

In some embodiments of the cache memory device 10, the controller 14 may be configured to determine a percentage of how much of a file has been accessed. For example, the controller 14 may be configured to determine whether to store information related to an access request in the block cache segment 16 or the file cache segment 15 based at least in part on the determined percentage of how much of the file has been accessed. For example, the controller 14 may be configured to migrate block cache entries associated with the file from the block cache segment 16 to the file cache segment 15 when the percentage of how much the file has been accessed exceeds a selected threshold. For example, the selected threshold may be based at least in part on a relative utilization of the block cache segment 16 and the file cache segment 15.

In some embodiments of the cache memory device 10, the controller 14 may be configured to determine block cache segment eligibility based at least in part on whether a request for mass storage access is stored in or is eligible to be stored in the file cache segment 15. The controller 14 may also be configured to invalidate cache entries stored in the block cache segment 16 which correspond to cache entries stored in or eligible to be stored in the file cache segment 16.

In some embodiments of the cache memory device 10, the controller 14 may be further configured to receive a request for mass storage access, the request requesting information to be accessed on the mass storage device 13, and to cache the information in one of the file cache segment 15 and the block cache segment 16 in accordance with the respective file and block cache policies. For example, the mass storage access may correspond to either a read access or a write access. For example, the controller 14 may be an integrated part of a cache memory device or may be located elsewhere in the electronic system and coupled to the cache memory 11 by a bus or other electronic connection. In some embodiments, the segmented cache memory 11 may include a non-volatile cache memory.

Figure 2:
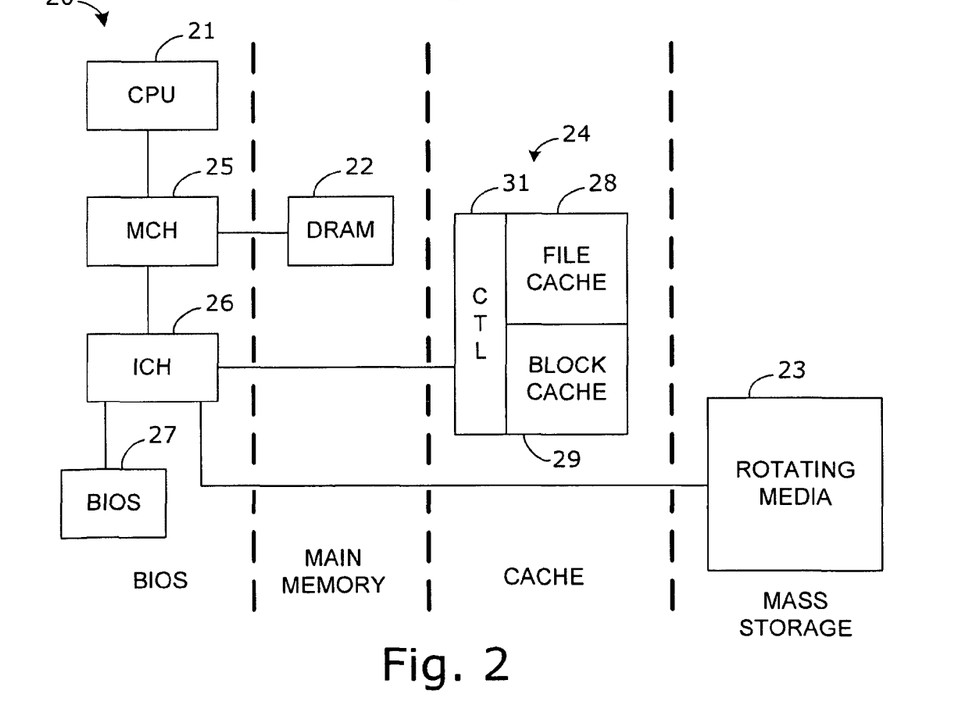
FIG. 2 is a block diagram of a processor-based system in accordance with some embodiments of the invention.

With reference to FIG. 2, a processor-based system 20 may include a processor 21, a system memory 22 coupled to the processor 21, a mass storage device 23, and a segmented cache memory 24 located between the system memory 22 and the mass storage device 23. For example, the processor 21 may be a central processing unit (CPU). For example, the system memory 22 may be a dynamic random access memory (DRAM). For example, the system memory 22 may be coupled to the processor 21 via a memory controller hub (MCH) 25. For example, the mass storage device 23 may be a rotating media such as a hard disk drive or an optical disk drive. For example, the mass storage device 23 may be a non-rotating media such as a solid-state drive. For example, both the cache 24 and the mass storage device 23 may be coupled to the MCH via an input/output controller hub (ICH) 26.

The processor-based system 20 may further include code stored on the processor-based system 20 to cause the processor-based system to utilize the segmented cache memory 24. For example, the code may be stored on the mass storage device 23, the system memory 22, or another memory or storage device coupled to the processor-based system 20. For example, the code may be stored as part of a basic input/output system (BIOS) 27 coupled to the ICH 26.

In some embodiments of the processor-based system 20, the segmented cache memory 24 may include a file cache segment 28, the file cache segment 28 to store complete files in accordance with a file cache policy, and a block cache segment 29, the block cache segment 29 to store one or more blocks of one or more files in accordance with a block cache policy, wherein the block cache policy is different from the file cache policy. For example, the code may be configured to cause the processor-based system 20 to utilize the file cache segment 28 in accordance with information related to the block cache segment 29 and to utilize the block cache segment 29 in accordance with information related to the file cache segment 28.

In some embodiments of the system 20, the code may be configured to cause the processor-based system 20 to determine a percentage of how much of a file has been accessed. For example, the code may be configured to cause the processor-based system to determine whether to store information related to an access request in the block cache segment 29 or the file cache segment 28 based at least in part on the determined percentage of how much of the file has been accessed. For example, the code may be configured to cause the processor-based system 20 to migrate cache entries associated with the file from the block cache segment 29 to the file cache segment 28 when the percentage of how much the file has been accessed exceeds a selected threshold. For example, the selected threshold may be based at least in part on a relative utilization of the block cache segment 29 and the file cache segment 28.

In some embodiments of the system 20, the code may be configured to cause the processor-based system 20 to determine block cache segment eligibility based at least in part on whether a request for mass storage access is stored or is eligible to be stored in the file cache segment 28. In some embodiments, the code may also be configured to cause the processor-based system 20 to invalidate cache entries stored in the block cache segment 29 which correspond to cache entries stored in or eligible to be stored in the file cache segment 28.

Figure 3:
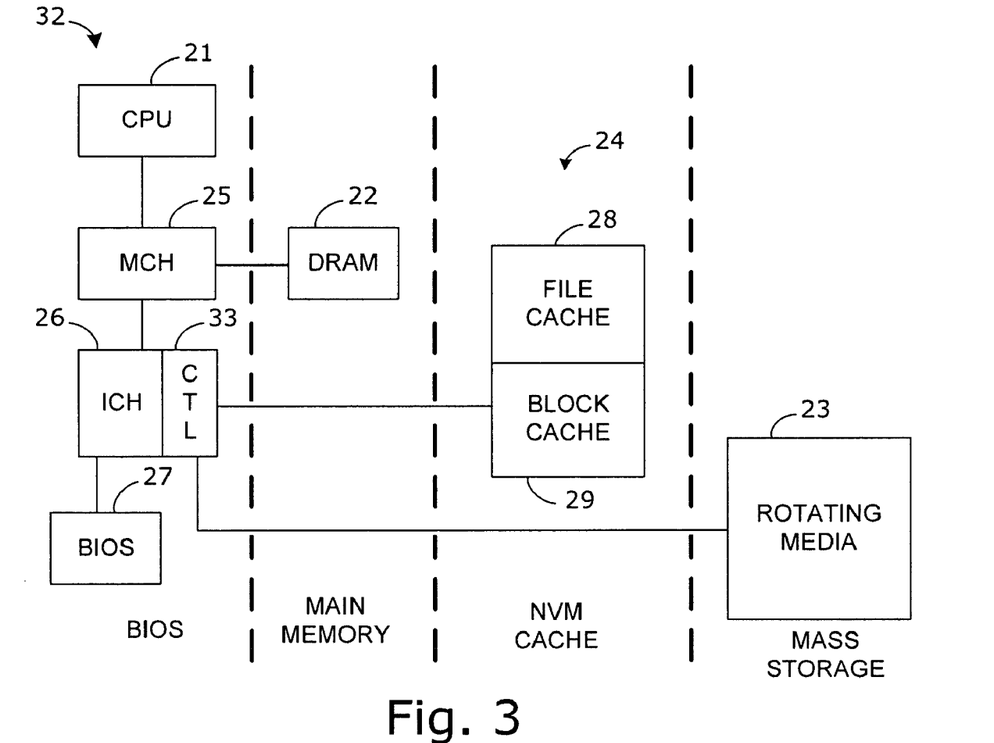
FIG. 3 is a block diagram of another processor-based system in accordance with some embodiments of the invention.

For example, in some embodiments of the processor-based system 20, all or a portion of the code may be implemented by or executed by a controller 31 which may be integrated with the segmented cache memory 24. Alternatively, with reference to FIG. 3, some embodiments of a processor-based system 32 may include a controller 33 located elsewhere in the processor-based system 32 and coupled to the segmented cache memory 24 by a bus or other electronic connection. For example, the controller 33 may be integrated with the ICH 26. In some embodiments of the processor-based system 32, the segmented cache memory 24 may include non-volatile cache memory (NVM).

Figure 4:
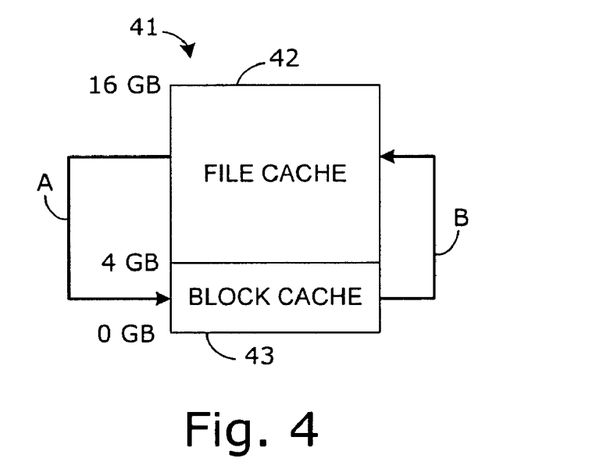
FIG. 4 is a block diagram of a segmented cache memory in accordance with some embodiments of the invention.

With reference to FIG. 4, a non-volatile cache memory device 41 may include a file cache segment 42 and a block cache segment 43. In accordance with some embodiments of the invention, the NVM cache 41 may utilize a dual mode file and block I/O caching technique. Conventional caching techniques typically utilize either a per-file basis or per-block basis, with the per-block method having much lesser granularity because files can be composed of many disk blocks. Caching individual disk blocks of a file may result in relatively efficient use of the cache capacity, because some large files may be only partially accessed. However, this space efficiency may cause a problem of increased cache management overhead and complexity. File based caching with greater granularity addresses this by reducing cache management overheads. Advantageously, some embodiments of the invention provide a hybrid caching system that may integrate file and block I/O caching techniques to improve cache efficiency and reduce cache management overhead.

In accordance with some embodiments of the invention, the NVM cache 41 may be logically segmented into two distinct regions, namely the file cache segment 42 and the block cache segment 43. Each of these regions may be managed autonomously, but also provide information to each other via communication channels. For example, arrow A in FIG. 4 represents how the block cache segment 43 may be utilized in accordance with information related to the file cache segment 42. Arrow B in FIG. 4 represents how the file cache segment 42 may be utilized in accordance with information related to the block cache segment 43.

For example, the file cache segment 42 may provide information to the block cache segment 43 related to which blocks the file cache segment 42 has resident. The blocks resident in the file cache segment 42 may be determined to be not eligible for caching in block cache segment 43. For example, based on the information related to the blocks resident in the file cache segment 42, the block cache segment 43 may invalidate entries in the block cache segment 43 which correspond to the blocks resident in the file cache segment 42.

For example, the block cache segment 43 may provide status information to the file cache segment 42. For example, the status information may include information related to hit rate, percent dirty, percent cachelines in use, among other information. The file cache segment 42 may utilize the information from the block cache segment 43 to determine various operating parameters. For example, the relative sizes of the file cache segment 42 and the block cache segment 43 may be adjusted during operation based on the relative utilization of the two segments or other workload parameters. For example, if the block cache segment 43 was becoming nearly full but there was available space in the file cache segment 42, the size of the block cache segment 43 may be increased while the size of the file cache segment 42 may be decreased.

Alternatively, the file cache management software may utilize statistics reported from the block cache segment 43 to make migration decisions. For example, the file cache policy may include a parameter for a minimum file size for an access request to be eligible to be stored in the file cache segment 42. Based on a high utilization of the block cache segment 43, the minimum file size parameter may be reduced and blocks stored in the block cache segment 43 corresponding to files which meet the new minimum file size parameter may be migrated to the file cache segment 42. Advantageously, the file cache segment 42 and the block cache segment 43 may exchange information and modify their respective file and block cache policies based on the exchanged information to tune their respective utilizations in accordance with a dynamically changing workload.

For the embodiment illustrated in FIG. 4, the example size of the NVM cache memory 41 is 16 gigabytes (GB) and the example size of the block cache segment is 4 GB. Other embodiments may utilize a larger or smaller cache memory size and/or a larger or smaller block cache segment size. In some embodiments of the invention, the file cache and block cache regions may be implemented on a NVM device with a file system or alternatively as a raw device. For example, each region may have an autonomous cache hit/miss determination. For the embodiment illustrated in FIG. 4, segmentation of the NVM cache 41 is represented as logical segments residing on one physical device. However, in some embodiments of the invention the file cache segment 42 and the block cache segment 43 may reside on separate physical devices and those devices may have different physical characteristics.

In accordance with some embodiments of the invention, each of the file and block regions may have a mostly independent cache policy. However, the two regions may be linked (e.g. through a controller) and communicate basic instructions and/or status to each other. For example, a disk block based cache policy may use information from the incoming request such as disk Logical Block Address (LBA), transfer size, and whether the request is a read or write (direction) to make block caching decisions. For example, a file based cache policy may use information such as file length, file name and initiating process ID to make file caching decisions. In accordance with some embodiments of the invention, a file cache policy may include an additional file cache policy metric corresponding to a percentage of file accessed.

For example, the file cache may maintain information relating to how much of a file is read or written when accessed. For example, the file cache software driver may receive information relating to the file size when opened, and may thereafter track information relating to addresses and total length of all accesses to that file until the close operation to produce a running 'percent accessed' statistic. For example, files which tend to have all of their blocks accessed, or files below a certain size may be good candidates for the file cache. For example, large files that only have a fraction of their total size accessed in practical usage (e.g. the system paging file) may be marked as a cache candidate for the block cache.

Figure 5:
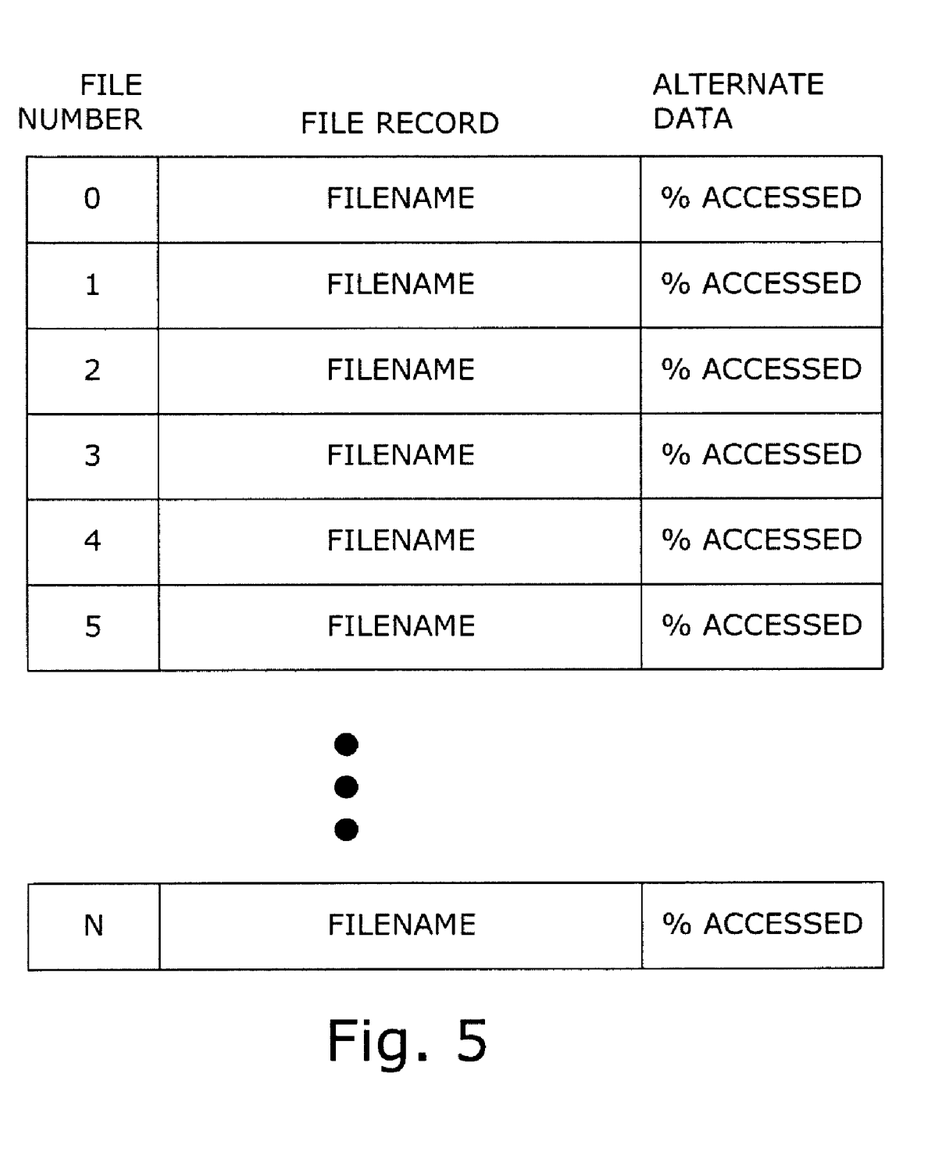
FIG. 5 is a block diagram of an example data structure in accordance with some embodiments of the invention.

With reference to FIG. 5, the file cache driver can store the 'percent accessed' statistic in a private data structure. For example, the data record can store a file identifier (e.g. a file number) and a file record (e.g. a file name) associated with an access request. The data record can further contain an alternate data field to store information relating to the percent accessed statistic. The percent accessed statistic may be updated in accordance with access requests made for the associated file. Alternatively, the percent accessed statistic may be stored in a data stream associated with the file itself.

For example, the file cache policy may be set such that small files and files which are accessed in their entirety would be preferentially stored to the file cache. The block cache policy may be set such that large files would be preferentially cached in the block cache. For example, the definition of small files and large files may be variable based on the size of the available non-volatile memory array. If a significant fraction of the file blocks were used when accessing a file stored in the block cache, the file may migrate from the block cache to the file cache, particularly if the block cache was becoming nearly full but there was available space in the file cache. Advantageously, in accordance with some embodiments of the invention, the file cache management software may utilize the statistics reported from the block cache to make migration decisions and other adjustments in the file cache policy.

In accordance with some embodiments of the invention, the file cache may communicate a 'block cache eligible' attribute associated with each I/O access which indicates to the block cache whether or not a specific I/O access should be considered for caching in the block cache. In the case that the block cache currently has a valid copy of the I/O access marked as 'block cache eligible'=NO, then the block cache copy of the block may be invalidated and written back to disk if dirty.

Figure 6:
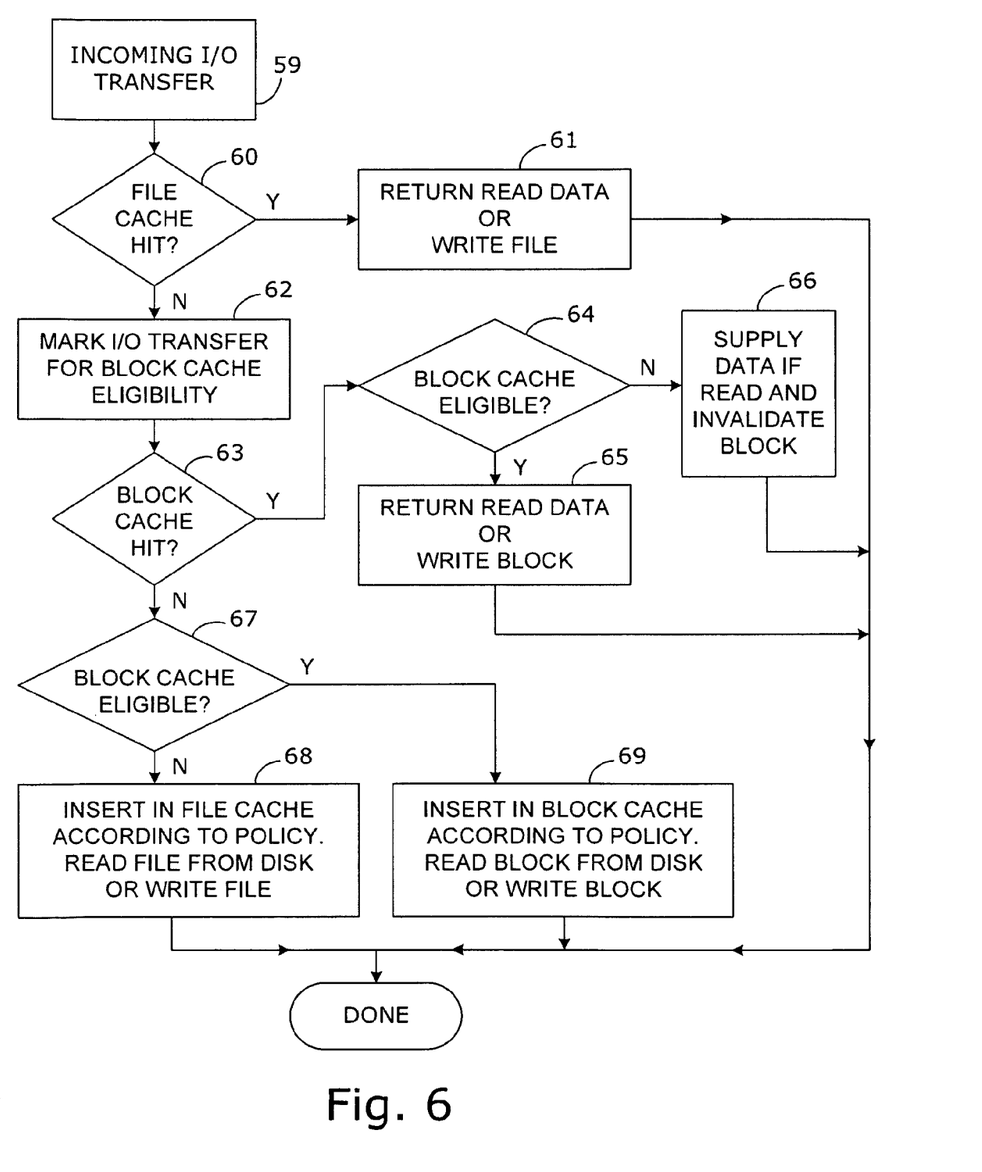
FIG. 6 is a flow diagram in accordance with some embodiments of the invention.

With reference to FIG. 6, in accordance with some embodiments of the invention, an incoming I/O transfer request is received (e.g. at block 59). If the request is determined to be a file cache hit (e.g. at block 60), read data is returned or the file is written from the file cache (e.g. at block 61). Otherwise, the I/O request is marked for block cache eligibility (e.g. at block 62). For example, the I/O request may be considered eligible for the block cache if the percent accessed statistic for the file associated with the I/O request is less than or equal to a selected threshold. For example, the I/O request may be considered ineligible for the block cache if the percent accessed statistic for the file associated with the I/O request exceeds the selected threshold. The block cache eligibility may also be based on other determinations in accordance with the file cache policy and/or the block cache policy.

If the request is determined to be a block cache hit (e.g. at block 63) and the request is marked as block cache eligible (e.g. at block 64), read data is returned or the file is written from the block cache (e.g. at block 65). If the request is determined to be a block cache hit (e.g. at block 63), but the request is not marked as block cache eligible (e.g. at block 64), the data is supplied if the request is a read request and the block is invalidated (e.g. at block 66).

If the request is determined to not be a block cache hit (e.g. at block 63) and the request is marked as block cache eligible (e.g. at block 67), the block corresponding to the I/O request is read from disk or written to disk and the entry is inserted into the block cache in accordance with the block cache policy (e.g. at block 69). If the request is determined to not be a block cache hit (e.g. at block 63) and the request is not marked as block cache eligible (e.g. at block 67), the file corresponding to the I/O request is read from disk or written to disk and the entry is inserted into the file cache in accordance with the file cache policy (e.g. at block 68).

Figure 7:
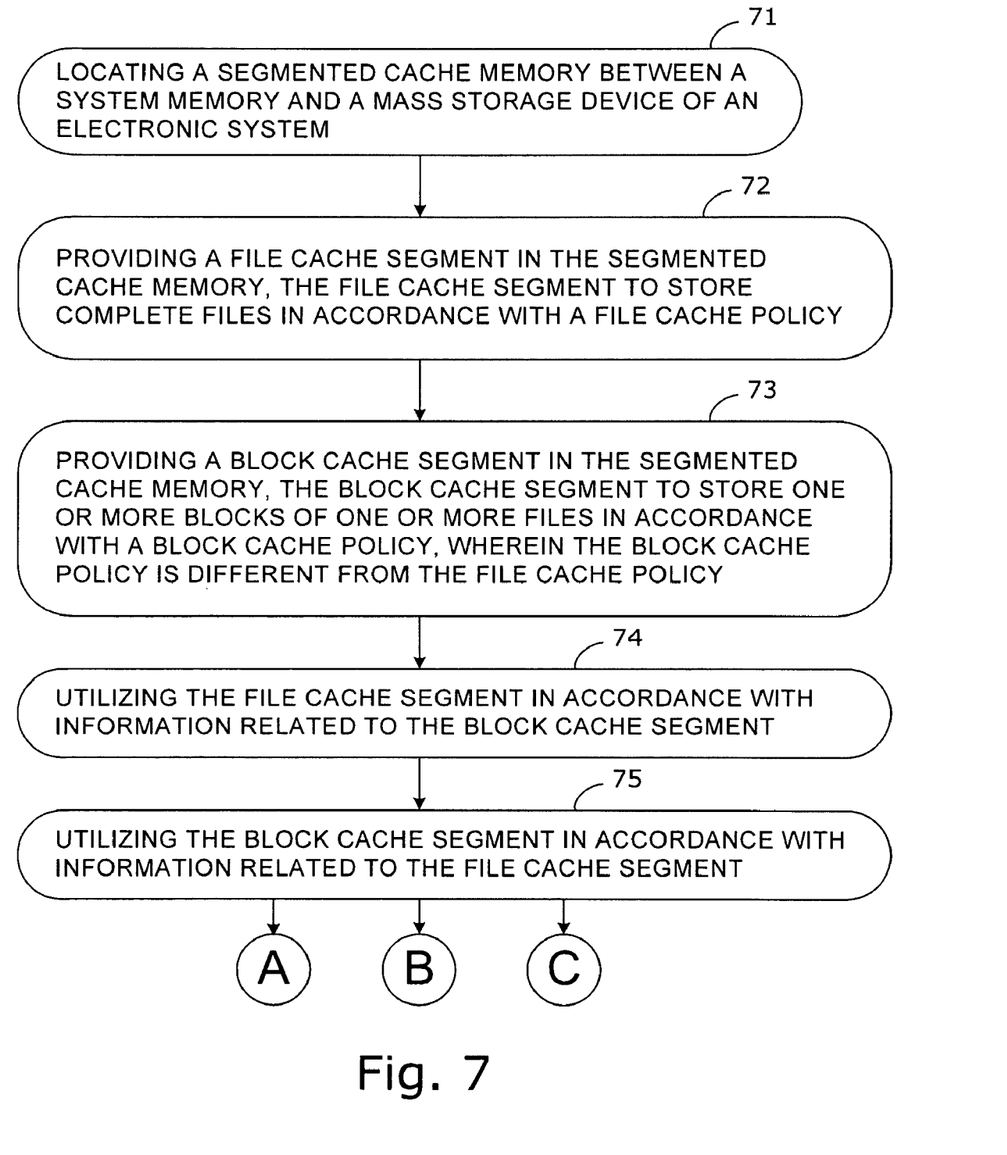
FIG. 7 is another flow diagram in accordance with some embodiments of the invention.

With reference to FIG. 7, in accordance with some embodiments of the invention, utilizing a cache memory may include locating a segmented cache memory between a system memory and a mass storage device of an electronic system (e.g at block 71), providing a file cache segment in the segmented cache memory, the file cache segment to store complete files in accordance with a file cache policy (e.g. at block 72), providing a block cache segment in the segmented cache memory, the block cache segment to store one or more blocks of one or more files in accordance with a block cache policy, wherein the block cache policy is different from the file cache policy (e.g. at block 73), utilizing the file cache segment in accordance with information related to the block cache segment (e.g. at block 74), and utilizing the block cache segment in accordance with information related to the file cache segment (e.g. at block 75).

Figure 8:
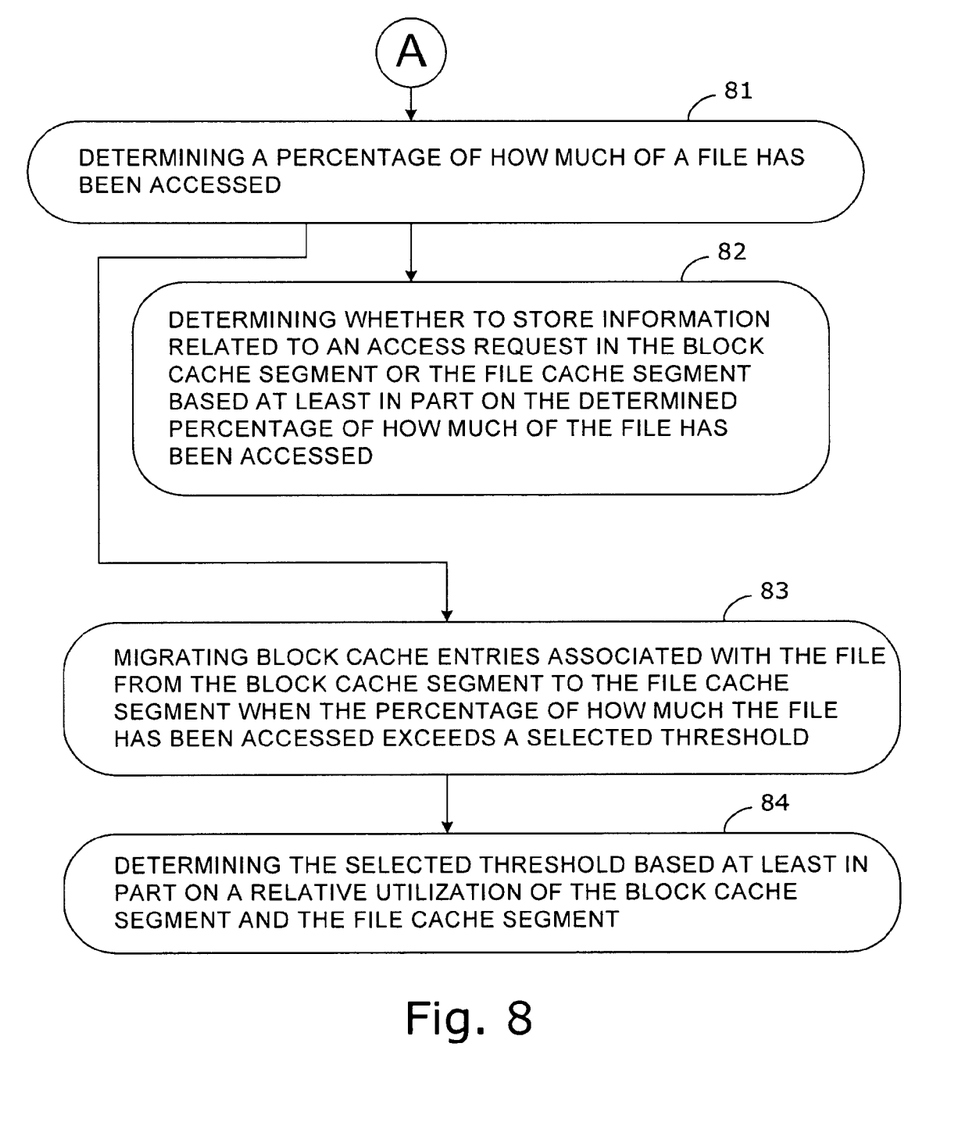
FIG. 8 is another flow diagram in accordance with some embodiments of the invention.

With reference to FIG. 8, some embodiments of the invention may further include determining a percentage of how much of a file has been accessed (e.g. at block 81). Some embodiments further include determining whether to store information related to an access request in the block cache segment or the file cache segment based at least in part on the determined percentage of how much of the file has been accessed (e.g. at block 82). Some embodiments may further include migrating block cache entries associated with the file from the block cache segment to the file cache segment when the percentage of how much the file has been accessed exceeds a selected threshold (e.g. at block 83). For example, some embodiments further include determining the selected threshold based at least in part on a relative utilization of the block cache segment and the file cache segment (e.g. at block 84).

Figure 9:
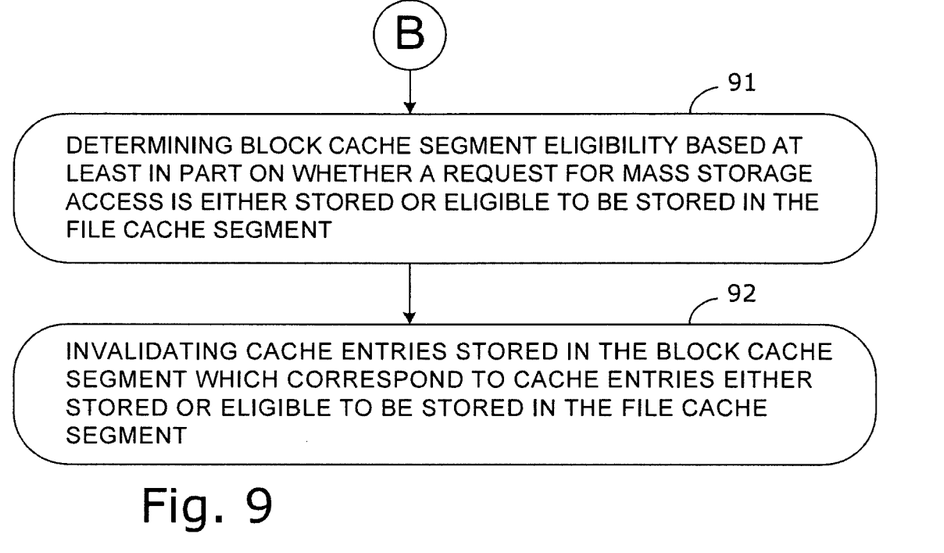
FIG. 9 is another flow diagram in accordance with some embodiments of the invention.

With reference to FIG. 9, some embodiments of the invention may further include determining block cache segment eligibility based at least in part on whether a request for mass storage access is either stored or eligible to be stored in the file cache segment (e.g. at block 91). Some embodiments may further include invalidating cache entries stored in the block cache segment which correspond to cache entries either stored or eligible to be stored in the file cache segment (e.g. at block 92).

Figure 10:
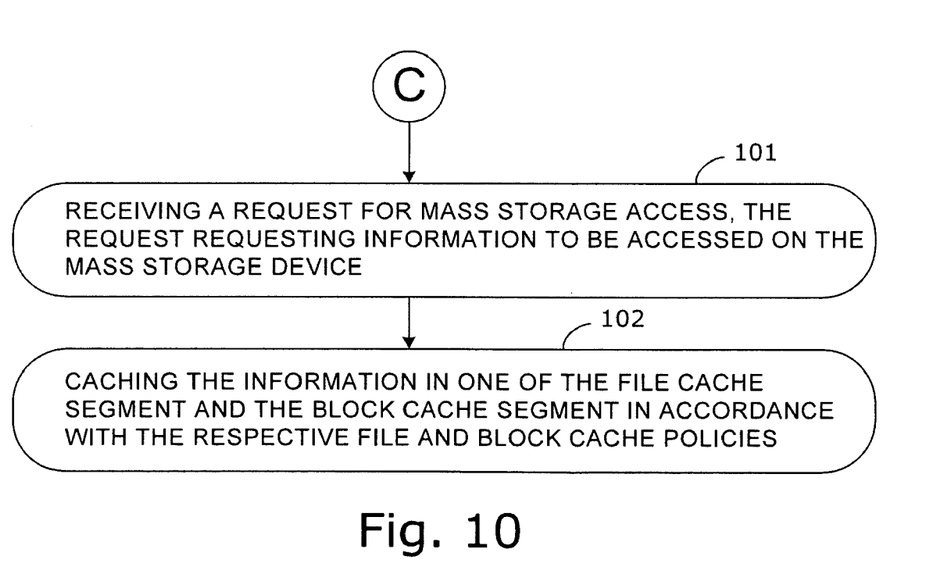
FIG. 10 is another flow diagram in accordance with some embodiments of the invention.

With reference to FIG. 10, some embodiments of the invention may further include receiving a request for mass storage access, the request requesting information to be accessed on the mass storage device (e.g. at block 101), and caching the information in one of the file cache segment and the block cache segment in accordance with the respective file and block cache policies (e.g. at block 102).

Those skilled in the art will appreciate that, given the benefit of the present description, a numerous variety of other circuits and combinations of hardware and/or software may be configured to implement various methods, circuits, and systems in accordance with the embodiments described herein and other embodiments of the invention. The examples of FIGS. 1 through 10 are non-limiting examples of suitable embodiments.

The foregoing and other aspects of the invention are achieved individually and in combination. The invention should not be construed as requiring two or more of such aspects unless expressly required by a particular claim. Moreover, while the invention has been described in connection with what is presently considered to be the preferred examples, it is to be understood that the invention is not limited to the disclosed examples, but on the contrary, is intended to cover various modifications and equivalent arrangements included within the spirit and the scope of the invention.

What is claimed is:

1. A processor-based system, comprising:
a processor;
a system memory coupled to the processor;
a mass storage device;
a segmented cache memory located between the system memory and the mass storage device wherein the segmented cache memory includes a file cache segment and a block cache segment; and
a computer readable storage medium having instructions, which, if executed by a processor, cause the processor-based system to store complete files in the file cache segment in accordance with a file cache policy and information related to the block cache segment, to store one or more blocks of one or more files in the block cache segment in accordance with a block cache policy and information related to the file cache segment wherein the block cache policy is different from the file cache policy, and to determine a percentage of a file accessed.

2. The system of claim 1 further comprising computer readable storage medium having instructions, which, if executed by a processor, cause the processor-based system to determine whether to store information related to an access request for a file in the block cache segment or the file cache segment based at least in part on a determined percentage of the file accessed.

3. The system of claim 1 further comprising computer readable storage medium having instructions, which, if executed by a processor, cause the processor-based system to migrate cache entries associated with a file from the block cache segment to the file cache segment when a percentage of the file accessed exceeds a selected threshold.

4. The system of claim 3, wherein the selected threshold is based at least in part on a relative utilization of the block cache segment and the file cache segment.

5. A non-volatile cache memory, comprising:
a segmented non-volatile cache memory configured to be located between a system memory and a mass storage device of an electronic system; and
a controller coupled to the segmented non-volatile cache memory,
wherein the segmented non-volatile cache memory includes a file cache segment and a block cache segment;
wherein the controller is configured to store complete files in the file cache segment in accordance with a file cache policy and information related to the block cache segment and to store one or more blocks of one or more files in the block cache segment in accordance with a block cache policy and information related to the file cache segment, wherein the block cache policy is different from the file cache policy; and
wherein the controller is configured to determine a percentage of a file accessed.

6. The cache memory of claim 5, wherein the controller is configured to determine whether to store information related to an access request for a file in the block cache segment or the file cache segment based at least in part on a determined percentage of the file accessed.

7. The cache memory of claim 5, wherein the controller is configured to migrate block cache entries associated with a file from the block cache segment to the file cache segment when a percentage of the file accessed exceeds a selected threshold.

8. The cache memory of claim 7, wherein the selected threshold is based at least in part on a relative utilization of the block cache segment and the file cache segment.

9. A method of utilizing a cache memory, comprising:
storing complete files in a file cache segment in accordance with a file cache policy and information related to a block cache segment;
storing one or more blocks of one or more files in the block cache segment in accordance with a block cache policy and information related to the file cache segment, wherein the block cache policy is different from the file cache policy; and
determining a percentage of a file accessed.

10. The method of claim 9, further comprising:
determining whether to store information related to an access request for a file in the block cache segment or the file cache segment based at least in part on a determined percentage of the file accessed.

11. The method of claim 9, further comprising:
migrating block cache entries associated with a file from the block cache segment to the file cache segment when a percentage of the file accessed exceeds a selected threshold.

12. The method of claim 11, further comprising:
determining the selected threshold based at least in part on a relative utilization of the block cache segment and the file cache segment.

13. The system of claim 1, wherein information related to the file cache segment includes identification of which blocks are stored in the file cache segment.

14. The system of claim 13, wherein information related to the block cache segment includes status information.

15. The cache memory of claim 5, wherein information related to the file cache segment includes identification of which blocks are stored in the file cache segment.

16. The cache memory of claim 15, wherein information related to the block cache segment includes status information.

17. The method of claim 9, wherein information related to the file cache segment includes identification of which blocks are stored in the file cache segment.

18. The method of claim 17, wherein information related to the block cache segment includes status information.

* * * * *